(12) United States Patent
de Jong et al.

(10) Patent No.: US 10,114,177 B2
(45) Date of Patent: Oct. 30, 2018

(54) TRANSLATING LENS HOLDER ASSEMBLIES EMPLOYING BORE RELIEF ZONES, AND OPTICAL CONNECTORS INCORPORATING THE SAME

(71) Applicant: Corning Optical Communications LLC, Hickory, NC (US)

(72) Inventors: Michael de Jong, Colleyville, TX (US); Micah Colen Isenhour, Lincolnton, NC (US); Dennis Michael Knecht, Hickory, NC (US); James Phillip Luther, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 375 days.

(21) Appl. No.: 14/197,645

(22) Filed: Mar. 5, 2014

(65) Prior Publication Data

US 2014/0185991 A1 Jul. 3, 2014

Related U.S. Application Data

(63) Continuation of application No. PCT/US2012/054059, filed on Sep. 7, 2012.
(Continued)

(51) Int. Cl.
*G02B 6/38* (2006.01)
*G02B 6/32* (2006.01)
(Continued)

(52) U.S. Cl.
CPC .......... *G02B 6/3853* (2013.01); *G02B 6/32* (2013.01); *G02B 6/3652* (2013.01); *G02B 7/02* (2013.01);
(Continued)

(58) Field of Classification Search
CPC .................................. G02B 6/38; G02B 7/02
(Continued)

(56) References Cited

U.S. PATENT DOCUMENTS

| 4,781,431 A | 11/1988 | Wesson et al. |
| 5,163,107 A | 11/1992 | Garriss |

(Continued)

FOREIGN PATENT DOCUMENTS

| AU | 199898138 | 7/2001 |
| CA | 2373226 | 8/2002 |

(Continued)

OTHER PUBLICATIONS

Patent Cooperation Treaty International Search Report, Application No. PCT/US2012/054059, dated May 3, 2013, 8 pages.
(Continued)

*Primary Examiner* — Kaveh C Kianni
(74) *Attorney, Agent, or Firm* — Robert L. Branham

(57) ABSTRACT

Translating lens holder assemblies employing bore relief zones, as well as optical connectors employing such lens holder assemblies, are disclosed. In one embodiment, a lens holder assembly includes a lens holder body having a mating face, a first forward slide portion and a first rear slide portion disposed on a first side of the lens holder body, and a second forward slide portion and a second rear slide portion disposed on a second side of the lens holder body. The first forward slide portion is separated from the first rear slide portion by a first bore relief zone, and the second forward slide portion is separated from the second rear slide portion by a second bore relief zone. In one embodiment, the lens holder assembly further includes at least one groove alignment feature disposed in the lens holder body that is configured to support at least one GRIN lens.

13 Claims, 6 Drawing Sheets

Related U.S. Application Data

(60) Provisional application No. 61/568,951, filed on Dec. 9, 2011, provisional application No. 61/533,986, filed on Sep. 13, 2011.

(51) Int. Cl.
  *G02B 6/36* (2006.01)
  *G02B 7/02* (2006.01)
  *G02B 6/42* (2006.01)

(52) U.S. Cl.
  CPC .......... *G02B 6/3829* (2013.01); *G02B 6/3885* (2013.01); *G02B 6/4214* (2013.01); *G02B 6/4249* (2013.01); *Y10T 29/49826* (2015.01)

(58) Field of Classification Search
  USPC ........................................................ 385/79
  See application file for complete search history.

(56) References Cited

U.S. PATENT DOCUMENTS

| | | | |
|---|---|---|---|
| 5,168,537 A | 12/1992 | Rajasekharan et al. | |
| 5,333,225 A | 7/1994 | Jacobowitz et al. | |
| 5,548,677 A * | 8/1996 | Kakii et al. | 385/92 |
| 5,917,976 A * | 6/1999 | Yamaguchi | 385/88 |
| 5,918,976 A | 7/1999 | Hashimoto et al. | |
| 6,056,448 A * | 5/2000 | Sauter et al. | 385/92 |
| 6,272,272 B1 | 8/2001 | Ford | |
| 6,530,696 B1* | 3/2003 | Ueda et al. | 385/60 |
| 6,633,700 B2 | 10/2003 | Bellman et al. | |
| 6,668,119 B2 | 12/2003 | Matsumoto et al. | |
| 6,823,109 B2 | 11/2004 | Sasaki et al. | |
| 7,269,317 B2 | 9/2007 | Blauvelt et al. | |
| 7,331,720 B1 | 2/2008 | McColloch | |
| 7,543,994 B2 | 6/2009 | McColloch | |
| 7,553,091 B2 | 6/2009 | McColloch | |
| 7,887,243 B2 * | 2/2011 | Abel et al. | 385/73 |
| 8,277,130 B2 | 10/2012 | Nishimura et al. | |
| 8,449,205 B2 | 5/2013 | Little et al. | |
| RE44,664 E | 12/2013 | McColloch | |
| 8,651,749 B2 | 2/2014 | Dainese, Jr. et al. | |
| 8,774,577 B2 | 7/2014 | Benjamin et al. | |
| 8,781,273 B2 | 7/2014 | Benjamin et al. | |
| 8,757,893 B1 | 9/2014 | Isenhour et al. | |
| 9,022,669 B2 | 5/2015 | de Jong et al. | |
| 9,069,142 B2 | 6/2015 | Fortusini et al. | |
| 9,151,900 B2 | 10/2015 | Benjamin et al. | |
| 9,151,912 B2 | 10/2015 | de Jong et al. | |
| 9,201,201 B2 | 12/2015 | Charbonneau-Lefort et al. | |
| 9,261,651 B2 | 2/2016 | Benjamin et al. | |
| 9,304,265 B2 | 4/2016 | Isenhour et al. | |
| 9,435,917 B2 | 9/2016 | DeMeritt et al. | |
| 2002/0031301 A1 | 3/2002 | Sasaki et al. | |
| 2002/0064347 A1* | 5/2002 | Mertz et al. | 385/52 |
| 2002/0168135 A1* | 11/2002 | Dautartas et al. | 385/17 |
| 2002/0172474 A1 | 11/2002 | Kim et al. | |
| 2003/0034438 A1* | 2/2003 | Sherrer et al. | 250/216 |
| 2003/0113071 A1* | 6/2003 | Kim et al. | 385/76 |
| 2003/0113077 A1* | 6/2003 | Xu et al. | 385/93 |
| 2003/0128437 A1 | 7/2003 | Sato et al. | |
| 2003/0201462 A1* | 10/2003 | Pommer et al. | 257/200 |
| 2003/0210873 A1* | 11/2003 | Moretti | 385/89 |
| 2004/0005124 A1* | 1/2004 | Gallup et al. | 385/88 |
| 2004/0081405 A1 | 4/2004 | Stevens et al. | |
| 2004/0109646 A1* | 6/2004 | Anderson et al. | 385/71 |
| 2006/0039655 A1* | 2/2006 | Wilson | 385/79 |
| 2006/0045421 A1* | 3/2006 | Baets et al. | 385/33 |
| 2006/0140544 A1* | 6/2006 | Morimoto et al. | 385/59 |
| 2006/0154884 A1 | 7/2006 | Buchwald | |
| 2006/0245694 A1* | 11/2006 | Chen et al. | 385/71 |
| 2007/0147733 A1 | 6/2007 | Matsumura et al. | |
| 2008/0095501 A1* | 4/2008 | McColloch | 385/59 |
| 2008/0095506 A1 | 4/2008 | McColloch | |
| 2008/0166094 A1 | 7/2008 | Bookbinder et al. | |
| 2009/0154884 A1* | 6/2009 | Chen et al. | 385/79 |
| 2009/0169163 A1 | 7/2009 | Abbott, III et al. | |
| 2009/0213894 A1 | 8/2009 | Grapov et al. | |
| 2009/0252455 A1 | 10/2009 | Ohta et al. | |
| 2010/0028563 A1 | 2/2010 | Ota | |
| 2010/0135618 A1 | 6/2010 | Howard et al. | |
| 2011/0064357 A1* | 3/2011 | Chang | 385/33 |
| 2011/0091167 A1 | 4/2011 | Nishimura | |
| 2011/0116746 A1* | 5/2011 | Chen | 385/74 |
| 2011/0150399 A1 | 6/2011 | Sabano et al. | |
| 2011/0229077 A1 | 9/2011 | Fortusini et al. | |
| 2011/0255825 A1 | 10/2011 | Ko et al. | |
| 2011/0317959 A1 | 12/2011 | Ohta et al. | |
| 2012/0027346 A1* | 2/2012 | Castagna et al. | 385/33 |
| 2012/0093462 A1* | 4/2012 | Childers et al. | 385/33 |
| 2012/0155803 A1* | 6/2012 | Benjamin et al. | 385/33 |
| 2012/0163754 A1* | 6/2012 | Benjamin et al. | 385/33 |
| 2012/0189252 A1 | 6/2012 | Bhagavatula et al. | |
| 2012/0177327 A1 | 7/2012 | DeMeritt et al. | |
| 2012/0227346 A1 | 9/2012 | Tsambasis | |
| 2012/0251045 A1* | 10/2012 | Budd et al. | 385/33 |
| 2012/0321249 A1 | 12/2012 | DeMeritt et al. | |
| 2012/0328245 A1 | 12/2012 | Lin | |
| 2014/0003767 A1 | 1/2014 | de Jong et al. | |
| 2014/0143996 A1 | 5/2014 | Bhagavatula et al. | |
| 2014/0178010 A1 | 6/2014 | de Jong et al. | |
| 2014/0185991 A1 | 7/2014 | de Jong et al. | |
| 2014/0308002 A1 | 10/2014 | Benjamin et al. | |
| 2014/0308003 A1 | 10/2014 | Benjamin et al. | |
| 2016/0202422 A1 | 7/2016 | de Jong et al. | |

FOREIGN PATENT DOCUMENTS

| | | | |
|---|---|---|---|
| CN | 101828137 | 9/2010 | |
| CN | 101828137 A | 9/2010 | |
| CN | 102122035 | 7/2011 | |
| CN | 102122035 A | 7/2011 | |
| CN | 102147508 | 8/2011 | |
| CN | 102147508 A | 8/2011 | |
| CN | 102082342 | 11/2013 | |
| DE | 19932907 A1 | 2/2001 | .............. G02B 6/43 |
| EP | 0393829 | 3/1990 | |
| EP | 0760488 | 3/1997 | |
| EP | 0860720 | 8/1998 | |
| EP | 1237021 | 9/2002 | |
| EP | 1447695 | 8/2004 | |
| FR | 2545617 | 11/1984 | |
| GB | 2097550 | 11/1982 | |
| GB | 2359901 | 9/2001 | |
| JP | 57076509 | 5/1982 | |
| JP | 57139704 | 8/1982 | |
| JP | 57158824 | 9/1982 | |
| JP | 63-174004 | 7/1988 | .............. G02B 6/38 |
| JP | 63174004 | 7/1988 | |
| JP | 1988293510 | 11/1988 | |
| JP | 2001004863 | 1/2001 | |
| JP | 2004219478 | 8/2004 | |
| JP | 2007041222 | 2/2007 | |
| JP | 2007163969 | 6/2007 | |
| JP | 2011116955 | 6/2011 | |
| JP | 2011116955 A | 6/2011 | |
| JP | 4742429 | 8/2011 | |
| WO | 199734176 | 9/1997 | |
| WO | WO97/34176 | 9/1997 | .............. G02B 6/38 |
| WO | 200070381 | 11/2000 | |
| WO | WO00/70381 | 11/2000 | .............. G02B 6/38 |
| WO | 2001011409 | 2/2001 | |
| WO | 2002056076 | 7/2002 | |
| WO | 2002057826 | 7/2002 | |
| WO | WO02/056076 A2 | 7/2002 | .............. G02B 6/32 |
| WO | WO02/057826 A1 | 7/2002 | .............. G02B 6/36 |
| WO | 2003076993 | 9/2003 | |
| WO | 2006108024 | 10/2006 | |
| WO | 2013086117 | 6/2013 | |
| WO | 2013086127 | 6/2016 | |

(56) References Cited

OTHER PUBLICATIONS

Chanclou et al; "Design and Demonstration of a Multicore Single-Mode Fiber Coupled Lens Device"; Optics Communications; 233; (2004) 333-339.
CN2012800642479 Office Action dated Apr. 17, 2015.
CN2012800647985 Search Report dated Apr. 23, 2015.
Cusworth et al; "Angular Tilt Misalignment Loss at a Grin Rod Lens Coupler"; Applied Optics, vol. 25, No. 11; Jun. 1, 1986; pp. 1775-1779.
Emkey et al; "Analysis and Evaluation of Graded-Index Fiber-Lenses"; Journal of Lightwave Technology, vol. LT5, No. 9, Sep. 1987, pp. 1156-1164.
Gilsdorf et al; "Single-Mode Fiber Coupling Effieciency With Graded-Index Rod Lenses"; Applied Optics, vol. 33, No. 16, Jun. 1, 1994 pp. 3440-3445.
Gradient-Index Lenses, Optical Components; www.cvimellesgriot.com.
International Search Report and Written Opinion of the International Searching Authority; PCT/US2012/068159 dated Jul. 4, 2013; 20 Pages.
International Search Report of the International Searching Authority; PCT/US2012/054054; dated Nov. 28, 2012.
International Search Report of the International Searching Authority; PCT/US2012/068144 dated Jul. 4, 2013.
Nakagawa et al; "Lens-Coupled Laser Diode Module Integrated on Silicon Platform"; Journal of Lighwave Technology, vol. 14, No. 6, Jun. 1996; pp. 1519-1523.
Palais; "Fiber Coupling Using Graded-Index Rod Lenses"; Applied Optics, vol. 19, No. 12, Jun. 15, 1980, pp. 2011-2018.
Senior et al; "Misalignment Losses at Multimode Graded-Index Fiber Splices and Grin Rod Lens Couplers"; Applied Optics, vol. 24, No. 7; Apr. 1, 1985; pp. 977-983.
Tomlinson; "Applications for Grin-Rod Lenses in Optical Fiber Communication Systems"; Applied Optics; vol. 19, No. 7, Apr. 1, 1980; pp. 1127-1138.
"Zickar et al; ""MEMS Compatible Micro-Grin Lenses for Fiber to Chip Coupling of Light""; Optics Express, vol. 14, No. 10, May 2006; pp. 4237-4249".
CN2012800647985 Office Action dated Apr. 23, 2015.
CN2012800434902 Search Report dated Feb. 16, 2015.
International Search Report and Written Opinion of the International Searching Authority; PCT/US2012/054059 dated May 3, 2013; 29 Pages.
Zickar et al; "MEMS Compatible Micro-Grin Lenses for Fiber to Chip Coupling of Light"; Optics Express, vol. 14, No. 10, May 2006; pp. 4237-4249.
Chinese Search Report, Application No. 2012800434902, dated Feb. 16, 2015, 2 pages.
Chinese Office Action, Application No. 2012800434902, dated Mar. 2, 2015.
European Communication, Application No. 12774325.9, dated Apr. 24, 2014.
PCT International Search Report, Application No. PCT/US2012/054059, dated May 3, 2013.

* cited by examiner

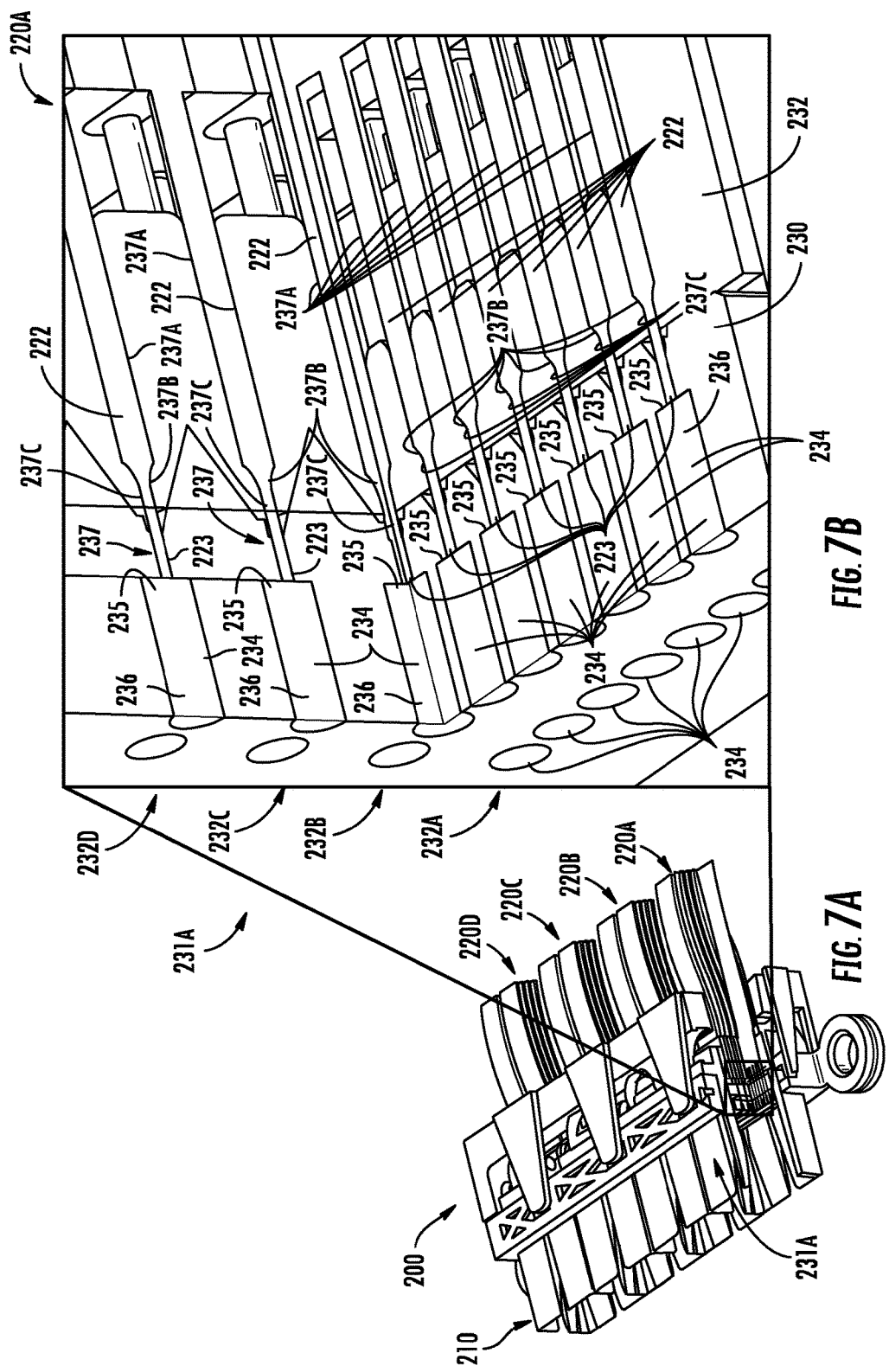

TRANSLATING LENS HOLDER ASSEMBLIES EMPLOYING BORE RELIEF ZONES, AND OPTICAL CONNECTORS INCORPORATING THE SAME

RELATED APPLICATIONS

This application is a continuation of International Application No. PCT/US12/54059 filed on Sep. 7, 2012, which claims the benefit of priority to U.S. Application No. 61/568,951 filed on Dec. 9, 2011, and U.S. Application No. 61/533,986 filed on Sep. 13, 2011, the content of which is relied upon are incorporated herein by reference in their entirety.

BACKGROUND

Field of the Disclosure

The technology of the disclosure relates to lens holder assemblies configured to support gradient index (GRIN) lens, wherein the lens holder assemblies may be employed in plugs, receptacles and the like for facilitating optical connections.

Technical Background

Benefits of optical fiber include extremely wide bandwidth and low noise operation. Because of these advantages, optical fiber is increasingly being used for a variety of applications, including, but not limited to, broadband voice, video, and data transmission as end-users require more bandwidth. Fiber optic networks employing optical fiber are used to deliver voice, video, and data transmissions to subscribers over both private and public networks. As optical cable assemblies begin to be utilized in consumer electronics applications for allowing higher data transfer speeds between electronic devices the limitations of conventional telecommunication cable assembly designs are realized. Although, telecommunication fiber optic networks often include separated connection points linking optical fibers to provide "live fiber" from one connection point to another connection point using cable assemblies, the needs and environment for consumer application cable assemblies are much different. In this regard, fiber optic equipment is located in data distribution centers, central offices, or other clean environments for supporting optical fiber interconnections do not typically experience the large number of mating cycles like will be required for consumer electronic applications. Moreover, telecommunication cable assemblies are high-precision products that are typically protected from dirt, debris and the like; whereas, consumer electronic devices will need to operate in ordinary environments where exposure to dirt and debris will be a common occurrence.

By way of example, conventional fiber optic connectors for telecommunications use a flat end-faced multi-fiber ferrules for facilitating multiple direct optical fiber-to-optical fiber connections between the fiber optic connector supporting the ferrule and other fiber optic connectors or other devices having an optical connection. In this regard, it is important that fiber optic connectors are designed to allow the end faces of the optical fibers disposed in the ferrule to be placed into contact or closely spaced with an optical connection or other optical fiber for light transfer. These conventional multi-fiber, fiber optic connectors used for the telecommunication applications require a time-consuming manufacturing process for preparing a precision surface for direct optical fiber-to-optical fiber mating. By way of example, after the optical fibers are secured so the optical fiber extends beyond the mating end face, the excess fiber is removed by laser cleaving and the remaining protruding fiber is mechanically polished using abrasives for obtaining a precision end face with a highly planar array for maintaining tight alignment of optical fibers between connectors. When these connectors are mated, the end faces of the fibers touch providing for low-loss across the optical interface, but precise polishing is required to obtain this type of mating geometry. This high precision polishing is costly and difficult since it is time-consuming requires equipment and consumables for polishing and multiple manufacturing steps. Moreover, this type of construction is not well suited for the large number of mating cycles that a consumer device application is expected to experience. Thus, conventional constructions and methods for making cable assemblies are not suitable for cable assemblies directed to consumer devices for these and other reasons.

SUMMARY OF THE DETAILED DESCRIPTION

Fiber optic connectors having lens holders are disclosed to facilitate optical connections for the transfer of light signals between devices. For example, optical fibers can be optically connected to another optical device, such as a light-emitting diode (LED), laser diode, or opto-electronic device, for light/signal transfer. As another example, optical fibers can be optically connected to other optical fibers through mated fiber optic connectors as desired. In any of these cases, it is important that the end face of an optically connected optical fiber be precisely aligned with the optical device or other optical fiber to avoid or reduce coupling loss of the signal. For example, the optical fiber is disposed through a portion of a lens holder body that precisely locates the optical fiber with relation to the fiber optic lens.

Gradient index (GRIN) lenses offer an alternative to precision polishing used in telecommunication based connectors that have optical fiber-to-optical fiber mating. GRIN lenses focus light through a precisely controlled radial variation of the lens material's index of refraction from the optical axis to the edge of the lens. The internal structure of this index gradient can dramatically reduce the need for high precision polishing and results in a simple, compact lens. This allows a GRIN lens with flat surfaces to collimate light emitted from an optical fiber or to focus an incident beam into an optical fiber. The GRIN lens can be provided in the form of a glass rod that is disposed in a lens holder as part of a fiber optic connector. The flat surfaces of a GRIN lens allow easy bonding or fusing of one end to an optical fiber disposed inside the fiber optic connector with the other end of the GRIN lens disposed on the ferrule end face. The flat surface on the end face of a GRIN lens can reduce aberrations, because the end faces can be polished to be planar to slightly inset with respect to the end face of the ferrule. The flat surface of the GRIN lens allows for easy cleaning of end faces of the GRIN lens by the end user, which is advantageous since the assembly must withstand large numbers of mating/unmating cycles. It is important that the lens holder assembly be designed with internal holders that place and secure the GRIN lenses in alignment with the desired angular accuracy (i.e., tilt) to avoid or reduce coupling loss.

Embodiments disclosed herein include translating gradient index (GRIN) lens holders employing groove alignment feature(s). Non-limiting examples of such optical connectors include plugs and receptacles. In one embodiment, the lens holder assembly contains one or more internal groove alignment features configured to secure the one or more GRIN lenses in the lens holder assembly. The groove alignment features are also configured to accurately align the end faces of the GRIN lenses in a quick, simple and reliable manner for consumer applications. In a plug embodiment, the translating lens holder assembly comprises slide portions that enable the lens holder assembly to translate on alignment pins within a connector housing. The slide portions are separated by bore relief zones that facilitate the cleaning of the pins and the depositing of debris (e.g., liquid, dust, etc.) in a benign location with respect to the lens holder assembly. The lens holder assemblies disclosed herein can be provided as part of an optical fiber ferrule and/or a fiber optic component or connector for making optical connections. The lens holder assembly may have a monolithic structure or have a cover as desired according to the concepts disclosed herein. A fiber optic connector containing the lens holder assemblies disclosed herein may be optically connected to one or more optical fibers in another fiber optic connector or to an optical device, such as a laser-emitting diode (LED), laser diode, vertical-cavity surface-emitting laser (VCSEL), or opto-electronic device for light transfer.

In this regard, in one embodiment, a lens holder assembly includes a lens holder body having a mating face, a first forward slide portion and a first rear slide portion disposed on a first side of the lens holder body, and a second forward slide portion and a second rear slide portion disposed on a second side of the lens holder body. The first forward slide portion is longitudinally aligned with the first rear slide portion such that the first forward slide portion is separated from the first rear slide portion by a first bore relief zone, and the second forward slide portion is longitudinally aligned with the second rear slide portion such that the second forward slide portion is separated from the second rear slide portion by a second bore relief zone. The at least one optical component is located at the mating face and configured to be optically coupled to a mated optical component.

In another embodiment, an optical connector includes a connector housing, a lens holder body, a first alignment pin and a second alignment pin. The lens holder body includes a mating face, at least one optical component within the lens holder body, a first forward slide portion, a second forward slide portion, a first rear slide portion, and a second rear slide portion. The first forward slide portion is longitudinally aligned with the first rear slide portion such that the first forward slide portion is separated from the first rear slide portion by a first bore relief zone. The second forward slide portion is longitudinally aligned with the second rear slide portion such that the second forward slide portion is separated from the second rear slide portion by a second bore relief zone. The at least one optical component is optically coupled to the mating face. The first alignment pin is disposed within the first forward slide portion and the first rear slide portion, and the second alignment pin is disposed within the second forward slide portion and the second rear slide portion such that the lens holder body translates longitudinally along an optical axis of the optical connector on the first alignment pin and the second alignment pin.

In yet another embodiment, an optical connector includes a connector housing, a lens holder assembly, a first alignment pin, a second alignment pin, and a recessed cover. The lens holder body includes a mating face, an internal chamber, a recessed floor disposed in the internal chamber, a first forward slide portion and a first rear slide portion disposed on a first side of the recessed floor, and a second forward slide portion and a second rear slide portion disposed on a second side of the recessed floor. The first forward slide portion is longitudinally aligned with first rear slide portion such that the first forward slide portion is separated from the first rear slide portion by a first bore relief zone. The second forward slide portion is longitudinally aligned with the second rear slide portion such that the second forward slide portion is separated from the second rear slide portion by a second bore relief zone. At least one groove alignment feature is disposed in the recessed floor of the internal chamber of the lens holder body. The at least one groove alignment feature is configured to support at least one GRIN lens disposed in the internal chamber and substantially align at least one end portion of the at least one GRIN lens with the mating face. The recessed cover is disposed in the internal chamber between the first forward slide portion and the second forward slide portion of the lens holder body, and between the first rear slide portion and the second rear slide portion. Of course, it is noted that the concept of the bore relief zone may be used independently from the recessed cover concept or other features as desired. The first alignment pin is disposed within the first forward slide portion and the first rear slide portion, and the second alignment pin is disposed within the second forward slide portion and the second rear slide portion such that the lens holder assembly translates longitudinally along an optical axis of the optical connector on the first alignment pin and the second alignment pin.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 7A is a partial cutaway view of an optical connector comprising a GRIN lens array coupled to a fiber array according to one or more embodiments shown and described herein; and FIG. 7B is a partial cutaway, close-up view of the optical connector schematically depicted in FIG. 7A.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include lens holder assemblies and optical connectors employing bore relief zones. Non-limiting examples of connectors include plugs, receptacles, and the like. The lens holder assemblies described herein are configured to translate within a housing on one or more alignment pins. In one embodiment, the lens holder assembly contains one or more internal groove alignment features configured to secure one or more gradient index (GRIN) lenses in the lens holder assembly. The groove alignment features are also configured to accurately align the end faces of the GRIN lenses within the lens holder so as to align with optical fibers internally and with a complimentary device externally. In another embodiment, the lens holder assembly comprises one or more refractive lens for optically coupling the lens holder assembly to a mated connector.

The lens holder assembly comprises pairs of slide portions that are each separated by a bore relief zone. The slide portions are configured to accept an alignment pin such that the lens holder assembly may translate within a connector housing of the optical connector. With this arrangement, the bore relief zones may provide for less contact surface area between the lens holder assembly and the alignment pins, thereby minimizing friction between these elements. The bore relief zones also provide for cleaning of the alignment pins, and the depositing of undesirable debris (e.g., liquids, dust, etc. that may enter the connector housing) in a benign location between the slide portions by wiping upon mating/unmating. Further, the bore relief zones enable the bores of the lens holder assembly to be fitted with one or more optional sleeves for reducing friction between the lens holder assembly and the alignment pins as desired.

The lens holder assemblies disclosed herein can be provided as part of an optical fiber ferrule and/or a fiber optic component or connector for making optical connections. A fiber optic connector containing the lens holder assemblies disclosed herein may be optically connected to one or more optical fibers in another fiber optic connector or to an optical device, such as a laser-emitting diode (LED), laser diode, vertical-cavity surface-emitting laser (VCSEL), or optoelectronic device for light transfer. As a non-limiting example, the lens holder assemblies disclosed herein can be provided as part of a plug or receptacle containing one or more optical fibers for establishing optical connections.

Figure 1:
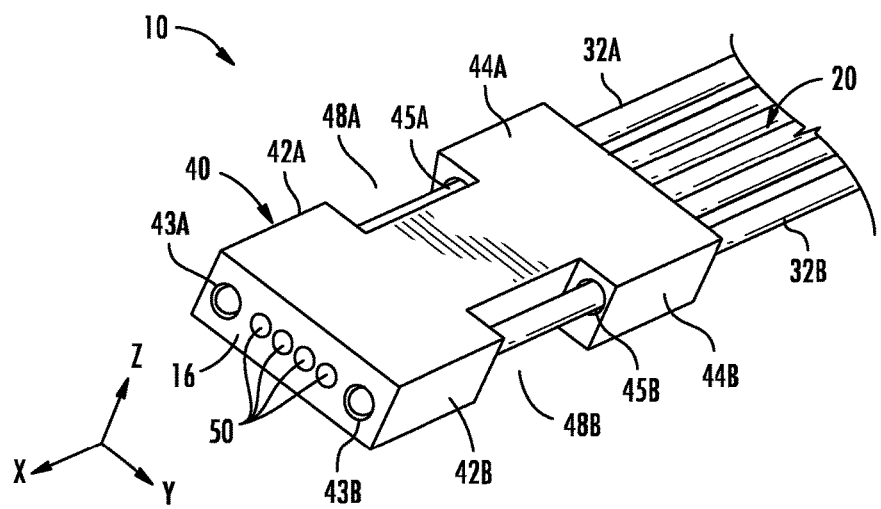
FIG. 1 is a front perspective view of a lens holder assembly having a pair of bore relief zones.

In this regard, FIG. 1 is a perspective view of an explanatory lens holder assembly 10 for use with the connector concepts disclosed herein. As described below, the lens holder assembly 10 may be a translating component of an optical connector for communicating optical signals between coupled devices. The lens holder assembly 10 generally comprises a lens holder body 40 having a mating face 16. One or more optical components 50 are located at the mating face and coupled to optical fibers 20 within the lens holder body 40. The optical components 50 in the illustrated embodiment are refractive lenses configured to refract optical signals propagating within the optical fibers 20 such that the optical signals are properly received optical components of a mated connector. The refractive lenses 50 may be a separate component(s) that is held by the lens holder body 40, or integral components that are integrated into lens holder body 40 such that the lens holder body 40 and the one or more refractive lenses 50 are a single component (e.g., the refractive lenses and the lens holder body may be formed using the same mold during a molding process). Simply stated, the refractive lenses may be molded into the lens holder assembly or be separate lenses that are attached. In other embodiments, the lens holder body may be formed from more than one-piece as discussed herein. The optical components may take on a variety of forms, such as GRIN lenses as described below, waveguides, optical fiber stubs, and any optical component capable of effectuating the coupling of optical signals from the optical fibers 20 to optical components of a mated connector.

The lens holder body 40 of the illustrated embodiment includes two slide portion pairs having bores that are configured to accept first and second alignment pins 32A, 32B. The first slide portion pair is defined by a first forward slide portion 42A (having a bore 43A) and a first rear slide portion 44A (having a bore 45A) that are separated by a first bore relief zone 48A. The second slide portion pair is defined by a second forward slide portion 42B (having a bore 43B) and a second rear slide portion 44B (having a bore 45B) that are separated by a second bore relief zone 48B. The first forward slide portion 42A is longitudinally aligned with the first rear slide portion 44A for receiving an alignment pin. Likewise, the second forward slide portion 42B is longitudinally aligned with the second rear slide portion 44B. A front surface of the first and second forward slide portions 42A, 42B define a portion of the mating face 16. The first and second bore relief zones 48A, 48B are a region of the lens holder body 40 where material is removed such that the first and second alignment pins 32A, 32B are exposed and not enclosed by the lens holder body 40 in these regions or zones. The removed material reduces the friction force and provides cleaning by wiping during mating/unmating of the lens body holder as discussed herein.

The bores 43A, 43B, 45A, 45B are sized and configured to accept first and second alignment pins 32A, 32B. The diameter of the bores 43A, 43B, 45A, 45B should be such that the inner circumferences of the bores 43A, 43B, 45A, 45B contact the first and second alignment pins 32A, 32B.

Figure 2A:
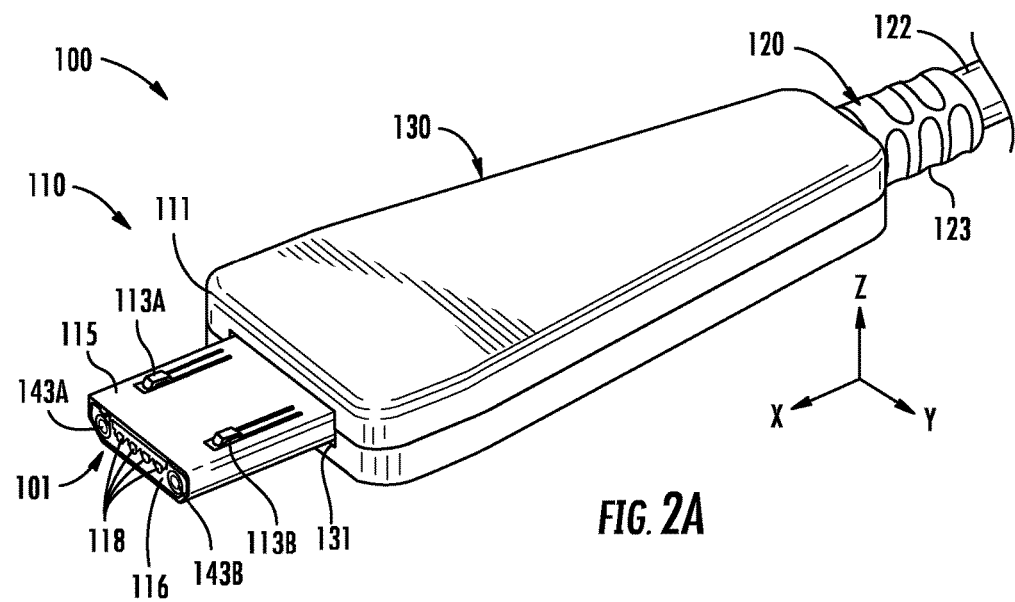
FIG. 2A is a front perspective view of an optical connector configured as a plug having a lens holder assembly within a connector housing.
Figure 2B:
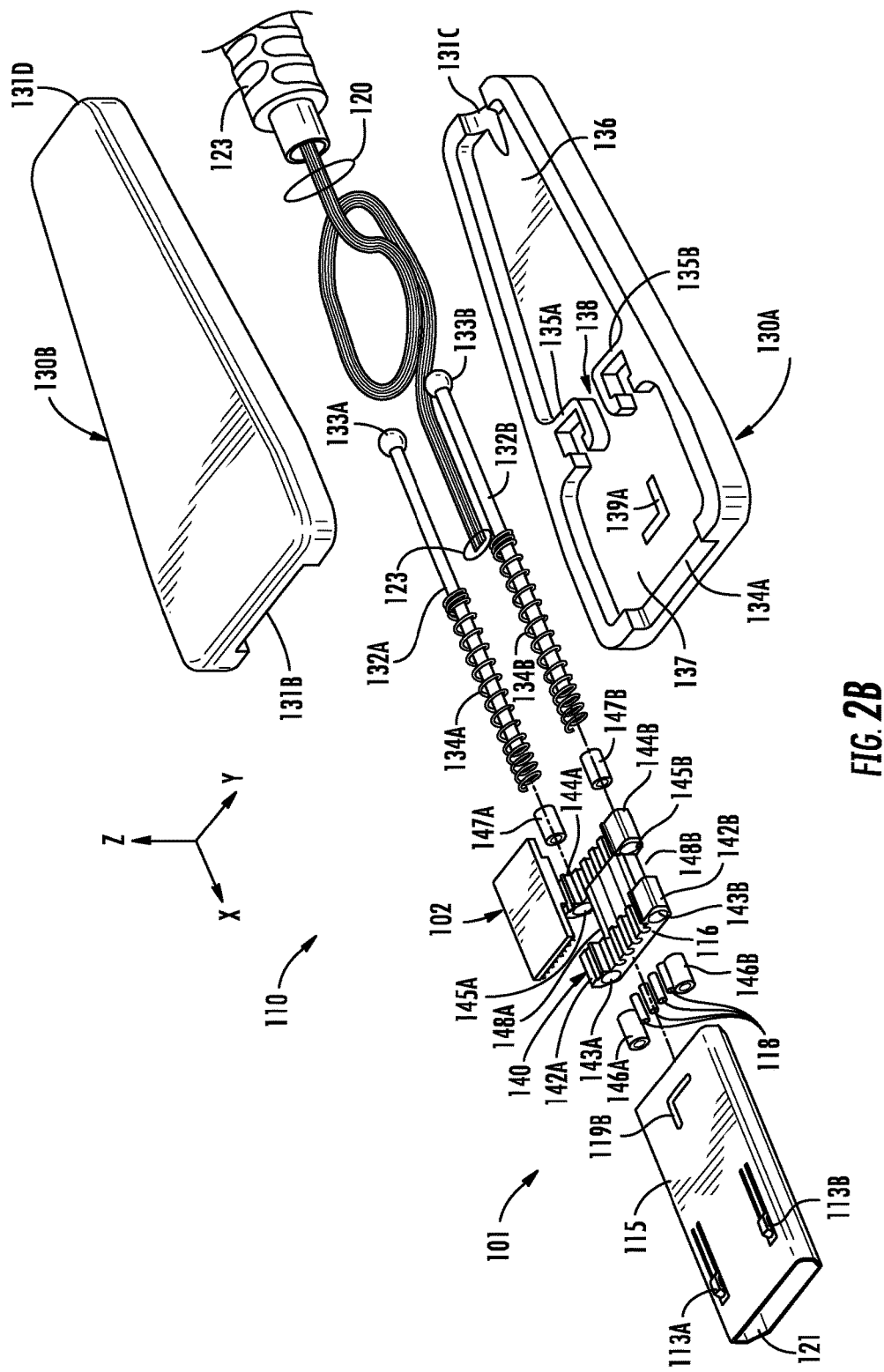
FIG. 2B is an exploded front perspective view of the plug of FIG. 2A.

The first and second bore relief zones 48A, 48B allow the bores 43A, 43B, 45A, 45B and the first and second alignment pins 32A, 32B to be cleaned as the lens holder assembly 10 is translated within a connector housing along an x-axis (e.g., connector housing 115 depicted in FIGS. 2A, 2B). Debris, such as liquids, dust and the like that may have entered the connector housing may be displaced such that it accumulates on the first and second alignment pins 32A, 32B between the first forward slide portion 42A and the first rear slide portion 44A (i.e., within the first bore relief zone 48A) and between the second forward slide portion 42B and the second rear slide portion 44B (i.e., within the second bore relief zone 48B), respectively. In other words, the first and second bore relief zones 48A, 48B may prevent debris from accumulating within the bores 43A, 43B, 45A, 45B. Such accumulation of debris within the bores 43A, 43B, 45A, 45B may inhibit the lens holder assembly 10 from translating within the connector housing and may also inhibit optical alignment of the optical components 50 (e.g., refractive lens components) with lenses or optical components of a mated optical connector.

FIG. 2A is a perspective view of an assembled exemplary optical connector employing a lens holder assembly configured to support and align GRIN lenses utilized as optical components to pass optical signals through the lens holder assembly. The optical connector in this embodiment is provided in the form of a plug 110 that is a component of an optical cable assembly 100. For example, the plug 110 may be a fiber optic connection plug that supports optical components for establishing optical connections and communication over the optical cable assembly 100. Alternatively, the plug 110 may also include electrical components disposed in the plug 110 for establishing electrical connections, as a non-limiting example. It should be understood that embodiments are not limited to the configurations of the exemplary plug 110 depicted in FIG. 2A, but merely are explanatory for the concepts disclosed.

More specifically, the plug 110 generally comprises a connector body 130 having a connector housing 115 extending from a front surface 111 of the connector body 130. The plug 110 further comprises optical fibers 120 disposed in a cable 122 secured to the connector body 130. The connector housing 115 defines a plug portion that may be inserted into a receptacle 170 (FIGS. 4A-4C) that could be incorporated into a complementary device for optical connectivity. The illustrated connector housing 115 comprises optional engagement features 113A, 113B that are configured to engage mated engagement features 175A, 175B of a receptacle connector housing 172, as described below with reference to FIG. 3.

Figure 4A:
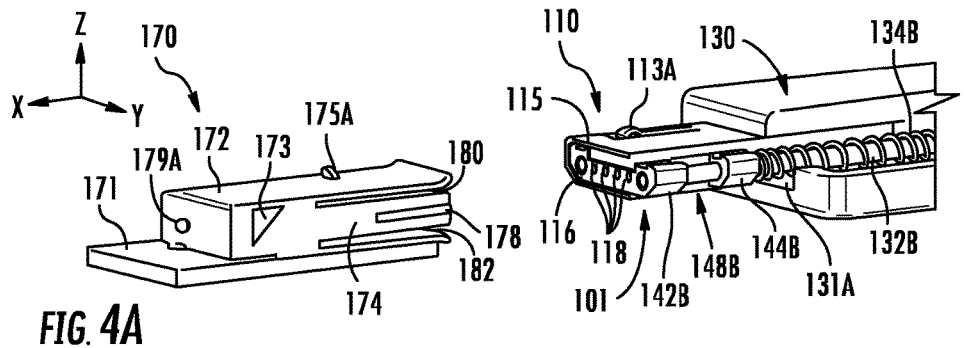
FIG. 4A is a partial cutaway, perspective view of the plug of FIG. 2A approaching the receptacle connector of FIG. 3.
Figure 4B:
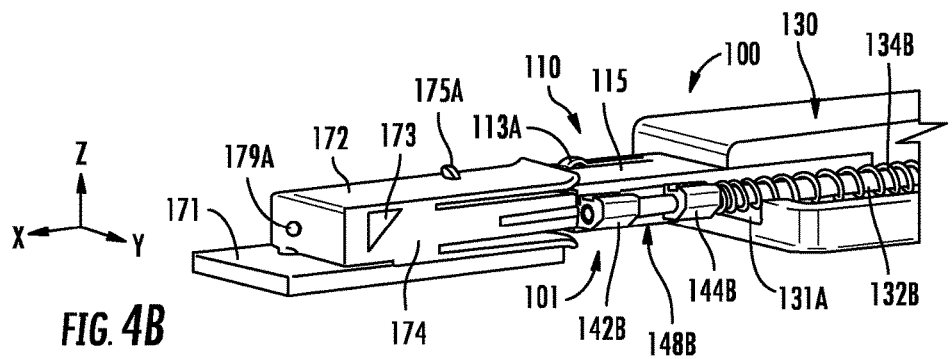
FIG. 4B is a partial cutaway, perspective view of the plug of FIG. 2A making initial contact with the receptacle connector of FIG. 3.
Figure 4C:
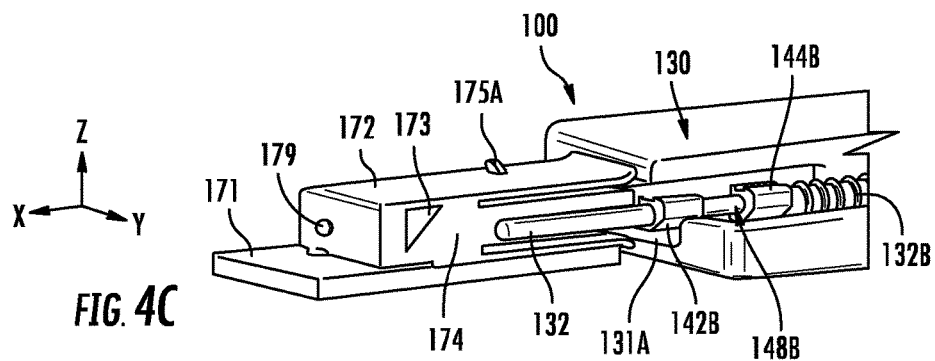
FIG. 4C is a partial cutaway, perspective view of the plug of FIG. 2A fully engaged with the receptacle connector of FIG. 3.

The connector housing 115 defines an optical connector opening 121 that exposes a lens holder assembly 101 that is maintained in an enclosure within the connector housing 115. As depicted in FIGS. 4A-4C, the lens holder assembly 101 of the particular embodiment is configured to translate along an x-axis (i.e., an optical axis of the plug 110) within the connector housing 115 when being mated with a complementary receptacle. Still referring to FIG. 2A, the illustrated lens holder assembly 101 comprises a lens holder body 140 having a mating face 116, and is configured with an open recess to receive a recessed cover 102 at or below the lens holder body 140 to seal off an internal chamber (not shown) disposed therein. Optical components, such as GRIN lenses 118 or the like, are disposed in the internal chamber in groove alignment features 150 to align the optical components with the mating face 116 of the lens holder body 140. Although embodiments described herein recite GRIN lenses, other optical components may be disposed within the lens holder assembly 101, such as optical fiber stubs and waveguides, for example.

The GRIN lenses 118 focus light through a precisely controlled radial variation of the lens material's index of refraction from the optical axis to the edge of the lens. The internal structure of this index gradient can dramatically reduce the need for tightly controlled surface curvatures and results in a simple, compact lens. This allows the GRIN lenses 118 with flat surfaces to collimate light emitted from the optical fibers 120 or to focus an incident beam into the optical fibers 120. In this embodiment, as will be described in more detail below, the GRIN lenses 118 are provided in the form of glass rods that are disposed in the lens holder assembly 101. The flat end face surfaces of the GRIN lenses 118 allow simple optical coupling of ends of the GRIN lenses 118 to end portions of the optical fibers 120 inside the plug 110, with the other end of the GRIN lenses 118 disposed on a mating face 116 of the lens holder body 140, as illustrated in FIG. 2A. The flat end face surfaces of the GRIN lenses 118 can also reduce aberrations.

Further, with continuing reference to FIG. 2A, the end faces of the GRIN lenses 118 can be planar to slightly inset to the mating face 116 (e.g., within 0-25 μm). In some embodiments, the end faces of the GRIN lenses 118 may be slightly recessed with respect to the mating face 116 to avoid physical contact with the GRIN lenses of a mated optical connector to prevent damage to the GRIN lenses 118. However, if the offset distance between the end faces of the GRIN lenses 118 is too large, it may create a dirt collection recess. In alternative embodiments the end faces of the GRIN lenses 118 may be flush with the mating face 116. The flat surface of the GRIN lenses 118 allows for easy cleaning of end faces of the GRIN lenses 118. As will be discussed in more detail below, the lens holder assembly 101 is designed with internal alignment features that support and align the GRIN lenses 118 in alignment with lens holder assembly 101 and the plug 110 to avoid or reduce coupling loss between the GRIN lenses 118 and optical components optically connected to the GRIN lens 118 through a mating to the plug 110.

Figure 2C:
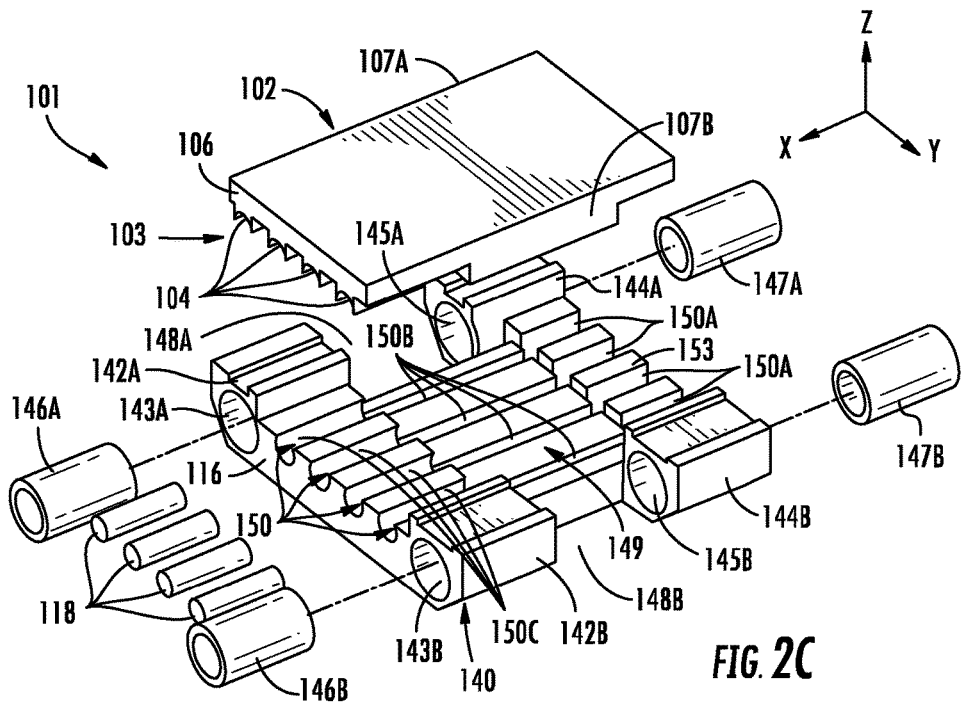
FIG. 2C is an exploded close-up view of a lens holder assembly of the plug of FIG. 2A.

Referring now to FIGS. 2B and 2C, the components of the plug 110 will be described in greater detail. FIG. 2B is an exploded, perspective view of the optical cable assembly 100 and plug 110 depicted in FIG. 2A, while FIG. 2C is an exploded, close-up view of the lens holder assembly 101 depicted in FIG. 2B. The lens holder assembly 101 is configured to be disposed within the connector housing 115 and translate along the x-axis on alignment pins 132A, 132B.

The lens holder body 140 of the illustrated embodiment includes two slide portion pairs having bores that are configured to accept first and second alignment pins 132A, 132B. The first slide portion pair is defined by a first forward slide portion 142A (having a bore 143A) and a first rear slide portion 144A (having a bore 145A) that are separated by a first bore relief zone 148A. The second slide portion pair is defined by a second forward slide portion 142B (having a bore 143B) and a second rear slide portion 144B (having a bore 145B) that are separated by a second bore relief zone 148B. The first forward slide portion 142A is longitudinally aligned with the first rear slide portion 144A. The second forward slide portion 142B is longitudinally aligned with the second rear slide portion 144B. The first and second bore relief zones 148A, 148B are a region of the lens holder body 140 where material is removed such that the first and second alignment pins 132A, 132B are exposed and not enclosed by the lens holder body 140 in these regions or zones.

The bores 143A, 143B, 145A, 145B are sized and configured to accept first and second alignment pins 132A, 132B, as described in detail below. The diameter of the bores 143A, 143B, 145A, 145B should be such that the inner circumference of the bores 143A, 143B, 145A, 145B contact the first and second alignment pins 132A, 132B so that the lens holder assembly 101 is positioned in the connector housing 115 within tolerances for optimal optical coupling between the plug 110 and a mated optical connector.

The first and second bore relief zones 148A, 148B allow the bores 143A, 143B, 145A, 145B and the first and second alignment pins 132A, 132B to be cleaned as the lens holder assembly 101 is translated within the connector housing 115 along the x-axis, which is advantageous for connectors requiring a large number of mating cycles. Debris, such as liquids, dust and the like that may have entered the connector housing 115, may be displaced such that it accumulates on the first and second alignment pins 132A, 132B between the first forward slide portion 142A and the first rear slide portion 144A (i.e., within the first bore relief zone 148A) and between the second forward slide portion 142B and the second rear slide portion 144B (i.e., within the second bore relief zone 148B), respectively. In other words, the first and second bore relief zones 148A, 148B may prevent debris from accumulating within the bores 143A, 143B, 145A, 145B. Such accumulation of debris within the bores 143A, 143B, 145A, 145B may inhibit the lens holder assembly 101 from translating within the connector housing 115 and may also inhibit optical alignment of the GRIN lenses 118 with lenses or optical components of a mated optical connector.

In the illustrated embodiment, optionally cylindrical sleeves 146A-146D are disposed within bores 143A, 143B, 145A, 145B to act as bearing elements for reducing friction between the lens holder assembly 101 and the first and second alignment pins 132A, 132B. The cylindrical sleeves 146A-146D may be made of any lubricious material to aid in the translation of the lens holder assembly 101 along the first and second alignment pins 132A, 132B. As an example and not a limitation, the cylindrical sleeves 146A-146B may be made of sintered bronze. It should be understood that cylindrical sleeves 146A-146D may also be utilized in embodiments having optical components other than GRIN lenses 118, such as the embodiment having refractive lenses 50 described in FIG. 1.

A front surface of the first and second forward slide portions 142A, 142B partially defines the mating face 116 of the lens holder assembly 101. Accordingly, the front surfaces of the first and second forward slide portions 142A, 142B contribute toward the coupling and alignment of the GRIN lenses 118 with optical components of a mated optical connector. Further, the front surfaces of the first and second forward slide portions 142A, 142B can provide increased stability of the lens holder body 140 in the y-axis direction.

Although the FIGS. 2B-2C show one specific lens body holder configuration, the concepts of the bore relief zone can be used with any suitable lens holder body such as one piece molded design without using a cover if desired of other designs using a cover. However, the embodiments of the assembly are depicted using a cover having open grooves for the groove alignment feature since they are typically easier to manufacture with the desired tolerance and control. The open grooves are sized for receiving the lenses and portions of the optical fibers having different relevant sizes and optically aligning the same for making optical communication between components. Moreover, portions of the grooves may be arranged on different planes of the located on different planes of the lens body holder to ensure proper optical fiber to lens alignment and/or lens to lens tilt alignment. By way of example, the optical fiber to lens is aligned to within 0.01 millimeters or less in the Y and Z directions and preferably aligned to within 0.008 millimeters or less in the Y and Z directions with respect to mating centerlines; and, the lens tilt is within 0.5 degrees or less from a reference axis.

Referring specifically to the exploded view of FIG. 2C, the first and second forward slide portions 142A, 142B and the first and second rear slide portions 144A, 144B define an internal chamber 149 having a recessed floor 153. The recessed floor 153 comprises a plurality of groove alignment features 150 having three different groove sections 150A, 150B, 150C that each have different groove sizes to accommodate and securely support the different outer diameter sized coated optical fibers 120 (such as a 250 micron coating of the optical fiber), bare optical fibers 120 (such as a 80-125 micron glass of the optical fiber), and GRIN lenses 118 (such as a 400 micron lens), respectively as one explanatory example. In other words, the groove alignment features changes from the front to the rear of the lens holder body 140 to accommodate the different sized features of the components. Although the plurality of groove alignment features 150 is illustrated as a series of rectangular-shaped grooves, embodiments are not limited thereto. As non-limiting examples, one or more groove sections 150A, 150B, 150C may be rectangular-shaped, V-shaped, circular-shaped, and/or combinations thereof. The plurality of groove alignment features 150 extend in the recessed floor 153 to form openings for both the optical fibers 120 and for the GRIN lenses 118 at the mating face 116. Referring to FIG. 2B, the end portions of the optical fibers 120 may be disposed in groove sections 150B, and the GRIN lenses 118 disposed in groove sections 150C. The end portions of the optical fibers 120 may be optically coupled to the GRIN lenses 118 within the groove alignment features 150.

As illustrated in FIGS. 2B and 2C, the recessed cover 102 contains first and second mating features 107A, 107B that are configured to interface with the first forward slide portion 142A and the first rear slide portion 144A, and the second forward slide portion 142B and the second rear slide portion 144B, respectively. In other words the first and second mating features 107A, 107B are configured to be disposed within the first and second bore relief zones 148A, 148B, respectively. The recessed cover 102 may be inserted into the internal chamber 149 with the first and second mating features 107A, 107B disposed in within the first and second bore relief zones 148A, 148B, respectively. In one embodiment, a front surface 106 of the recessed cover 102 is negatively offset with respect to the mating face 116 of the lens holder body 140 so that the front surface 106 of the recessed cover 102 does not contribute to the angular alignment of the GRIN lenses 118 during mating of the lens holder assembly 101 of the plug 110 and optical components of a mated optical connector (e.g., the receptacle connector 170 depicted in FIG. 3). The underside of the recessed cover 102 may or may not include corresponding groove alignment features 104 that may be positioned and configured to cover a top portion of the GRIN lenses 118 and the optical fibers 120 disposed within the internal chamber 149.

With continuing reference to FIGS. 2B and 2C, the GRIN lenses 118 can be disposed in the lens holder body 140 through the internal chamber 149, when the recessed cover 102 is removed. An appropriate index matching adhesive (e.g., epoxy or other) can then be disposed in the internal chamber 149, and the recessed cover 102 disposed in the open recess to seal off the internal chamber 149 and secure the GRIN lenses 118 inside the lens holder body 140. Lens holder assemblies 101 with separate lens holder bodies and recessed covers may be easily molded or stamped, a non-limiting example.

Referring specifically now to FIG. 2B, the plug 110 further comprises a connector body 130 defined by a first connector body half 130A and a second connector body half 130B. The first and second connector body halves 130A, 130B may each comprise a notch 131A, 131B that, when the first and second connector body halves 130A, 130B are coupled together (e.g., via mechanical engagement, adhesive or any other coupling means), define an opening 131 where at least a portion of the connector housing 115 may be disposed. The illustrated first connector body half 130A comprises an internal recess 137 that is configured to receive the lens holder assembly 101 when the plug 110 is coupled to a second optical connector, as described below with reference to FIGS. 4A-4B. Although not visible in FIG. 2B, the second connector body half 130B may include a similar internal recess. The internal recesses 137 of the first and second connector body halves 130A, 130B may also include location features 139A, 139B (it is noted that only location feature 139A is visible in FIG. 2B) that are configured as protrusions that may mate with a notch 119A, 119B (it is noted that only notch 119B is visible in FIG. 2B) to accurately position the connector housing 115 within the connector body 130. Notch 119B is configured to mate with location feature 139B, and notch 119A is configured to mate with location feature 139A for securing connector housing 115 with connector body 130.

The first connector body half 130A also may comprise alignment pin recess and engagement features 135A, 135B. The alignment pin recess and engagement features 135A, 135B may be configured to securely retain the first and second alignment pins 132A, 132B within the connector body 130 and the connector housing 115. As a non-limiting example, the first and second alignment pins 132A, 132B may include a rear portion 133A, 133B having a width or diameter that is greater than the remainder of the first and second alignment pins 132A, 132B on which the lens holder assembly 101 translates. The rear portion 133A, 133B of the first and second alignment pins 132A, 132B may be disposed in the alignment pin recess and engagement features 135A, 135B so that the first and second alignment pins 132A, 132B are securely disposed within the connector body 130 and the connector housing 115 at predetermined positions. It should be understood that the first and second alignment pins 132A, 132B may be disposed within the connector body 130 by other means.

The first connector body half 130A may also comprise an optical fiber recess 136, which may provide a region within the connector body 130 for the optical fibers 120 to be positioned as the lens holder assembly 101 is translated. For example, the optical fibers 120 may be positioned between the first and second alignment pin recess and engagement features 135A, 135B in gap 138. As the lens holder assembly 101 is translated along the x-axis into the connector body, the optical fibers 120 are pushed through the gap 138 into the optical fiber recess 136. The first and second connector body halves 130A, 130B may also comprise notches 131C, 131D that accept a strain relief 123.

The plug 110 further comprises first and second bias members 134A, 134B that are disposed about the first and second alignment pins 132A, 132B between the lens holder body 140 and the first and second alignment pin recess engagement features 135A, 135B, respectively. The first and second bias members 134A, 134B, which are configured as compression springs in the illustrated embodiment, bias the lens holder assembly 101 forward such that the mating face 116 is positioned at the connector opening 121 when the plug 110 is not mated with a second optical connector. The first and second bias members 134A, 134B compress when the lens holder assembly 101 is translated back into the connector body 130 on the first and second alignment pins 132A, 132B.

Figure 3:
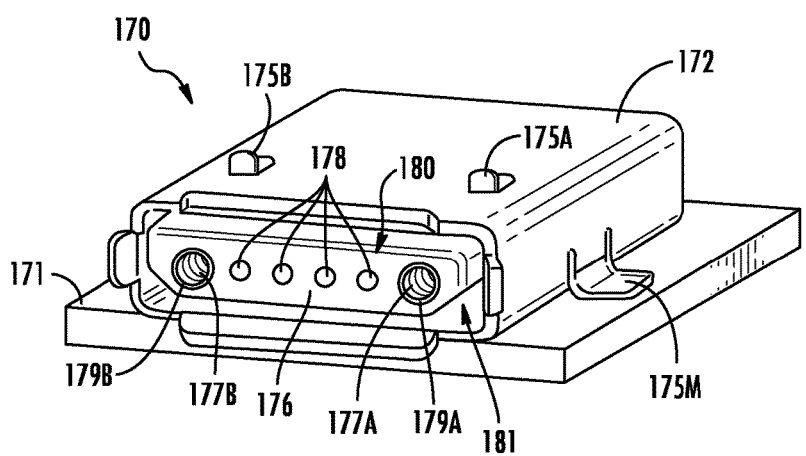
FIG. 3 is a front perspective view of a receptacle connector having a GRIN lens holder and configured to mate with the optical connector of FIG. 2A.

Referring now to FIG. 3, an exemplary receptacle 170 is illustrated. The receptacle 170 may provide a communications port for an electronic device, such as, but not limited to, a personal computer, an electronic data storage device, a tablet computer, a mobile communications device, and an application specific computing device. The receptacle 170 illustrated in FIG. 3 generally comprises a receptacle housing 172 that is coupled to a printed circuit board (PCB) 171 or the like, which may be a PCB maintained within a housing of an electronic device. The exemplary receptacle housing 172 comprises mounting tabs 175M which may be used to couple the receptacle housing 172 to the PCB 171, such as by the use of solder or an adhesive. The receptacle housing 172 further comprises engagement features 175A, 175B that are configured to be removably engaged with the engagement features 113A, 113B of the plug 110 when the two components are coupled together.

The receptacle 170 further comprises a lens holder assembly 180 disposed within an enclosure defined by the receptacle housing 172 such that a gap 181 exists between an outer surface of the lens holder assembly 180 and an inner surface of the receptacle housing 172. As described in more detail below with reference to FIGS. 4A-4C, the gap 181 is configured to receive the connector housing 115 when the plug 110 is inserted into the receptacle 170. The illustrated lens holder assembly 180 comprises a seamless, planar mating face 176 that is configured to couple with the mating face 116 of the lens holder assembly 101 of the plug 110. Although the illustrated lens holder assembly 180 is depicted as a single-piece component in FIG. 3, embodiments are not limited thereto. As an example and not a limitation, the lens holder assembly 180 may comprise a multi-component assembly comprising a lens holder body and a recessed cover. Further, a multi-component receptacle lens holder assembly may also have bore relief zones and/or groove alignment features as described above.

GRIN lenses 178 are disposed within the lens holder assembly 180 such that end faces of the GRIN lenses 178 are planar to slightly inset with respect to the mating face 176 (e.g., within 0-50 μm). The GRIN lenses 178 should be arranged within the lens holder assembly 180 for alignment with the GRIN lenses 118 of the plug 110 when the plug 110 is mated with the receptacle 170.

The lens holder assembly 180 additionally comprises a first bore 179A and a second bore 179B adjacent to the GRIN lenses 178 and configured to receive the first and second pins 132A, 132B of the plug 110, respectively, when the plug 110 is inserted into the receptacle 170. As described in more detail below, the first and second pins 132A, 132B of the plug 110 and the first and second bores 179A, 179B of the receptacle 170 provide an optical alignment of the mated GRIN lenses 118, 178. The first and second bores 179A, 179 may also comprise an optional sleeve 177A, 177B as a bushing element to reduce friction between the first and second pins 132A, 132B and the inner surface of the first and second bores 179A, 179B. As described above with respect to the plug 110, the sleeve may be made out of a lubricious material, such as, but not limited to, sintered bronze.

Referring now to FIGS. 4A-4C, internal components of the plug 110 and the receptacle 170 are schematically illustrated in partial cutaway, perspective views to depict the coupling of the plug 110 with the receptacle 170. FIG. 4A depicts the plug 110 positioned away from the receptacle 170, FIG. 4B depicts the plug 110 approaching the receptacle 170, and FIG. 4C depicts the plug 110 engaged with the receptacle 170 in a fully mated relationship. As the user pushes the plug 110 toward the receptacle 170, the mating face 116 of the lens holder assembly 101 associated with the plug 110 contacts the mating face 176 of the lens holder assembly 180 associated with the receptacle 170. The end faces of the GRIN lenses 118 disposed in the lens holder assembly 101 of the plug 110 contact, or nearly contact, the end faces of the GRIN lenses 178 disposed in the lens holder assembly 180 of the receptacle 170 such that the GRIN lenses 118, 178 are optically aligned and optical signals may pass therebetween.

The first and second pins 132A, 132B of the plug 110 are positioned within the first and second bores 179A, 179B, respectively, as the plug 110 is inserted into the receptacle 170. Referring specifically to FIG. 4C, as the plug 110 is pushed into the receptacle 170, the mating face 116 of the lens holder assembly 101 of the plug 110 is pushed against the mating face 176 of the lens holder assembly 101 of the receptacle 170 such that the lens holder assembly 101 is translated back within the connector housing 115 along the x-axis and is disposed within the connector body 130 when the plug 110 is fully engaged with the receptacle 170. The first and second bias members 134A, 134B are compressed within the connector body 130. Additionally, the connector housing 115 is disposed within the gap 181 of the receptacle 170 such that the engagement features 113A, 113B (it is noted that engagement feature 113B is not visible in FIGS. 4A-4C) of the plug 110 engage the engagement features 175A, 175B (it is noted that engagement feature 175B is not visible in FIGS. 4A-4C) to retain the plug 110 and the receptacle 170 in a mated connection.

The mating face 116 of the plug 110 physically contacts the mating face 176 of the receptacle 170 when the plug 110 is fully engaged within the receptacle 170. The lens holder assembly 180 of the receptacle 170 may comprise a total internal reflective (TIR) surface 173 that is provided to reflect light to and from the GRIN lenses 178 disposed therein. Light can be received through lenses (not shown in FIGS. 4A-4C) from a transmitting optical device (e.g., a laser diode) disposed on the PCB 171. This light may be reflected off the TIR surface 173 into the GRIN lenses 178. Similarly, light received from the GRIN lenses 178 may be reflected off the TIR surface 173 and focused by the lenses, which may be received by a receiving optical device, such as a photodiode.

The plug 110 may be disengaged from the receptacle 170 by pulling the plug 110 away from the electronic device that incorporates the receptacle 170, such that the engagement features 113A, 113B and 175A, 175B disengage from one another. While the plug 110 is removed from the receptacle 170, the bias members 134A, 134B translate the lens holder assembly 101 back toward the connector opening such that the mating face 116 and GRIN lenses 118 may be user-accessible (e.g., for cleaning purposes).

As described above, the first and second bore relief zones 148A, 148B assist in cleaning the bores 143A, 143B, 145A, 145B of the first and second forward slide portions 142A, 142B and the first and second rear slide portions 144A, 144B, as well as the first and second alignment pins 132A, 132B such that debris does not accumulate between the inner surface of the bores 143A, 143B, 145A, 145B and the first and second alignment pins 132A, 132B. The translating motion of the lens holder assembly 101 along the first and second alignment pins 132A, 132B as depicted in FIGS. 4A-4B may cause debris to be stripped away and/or pushed between the first and second forward slide portions 142A, 142B and the first and second rear slide portions 144A, 144B into the first and second bore relief zones 148A, 148B. Debris within the first and second bore relief zones 148A, 148B may not have a significant negative impact on the translation of the lens holder assembly 101 because it will not contact the inner surfaces of the bores 143A, 143B, 145A, 145B.

Figure 5:
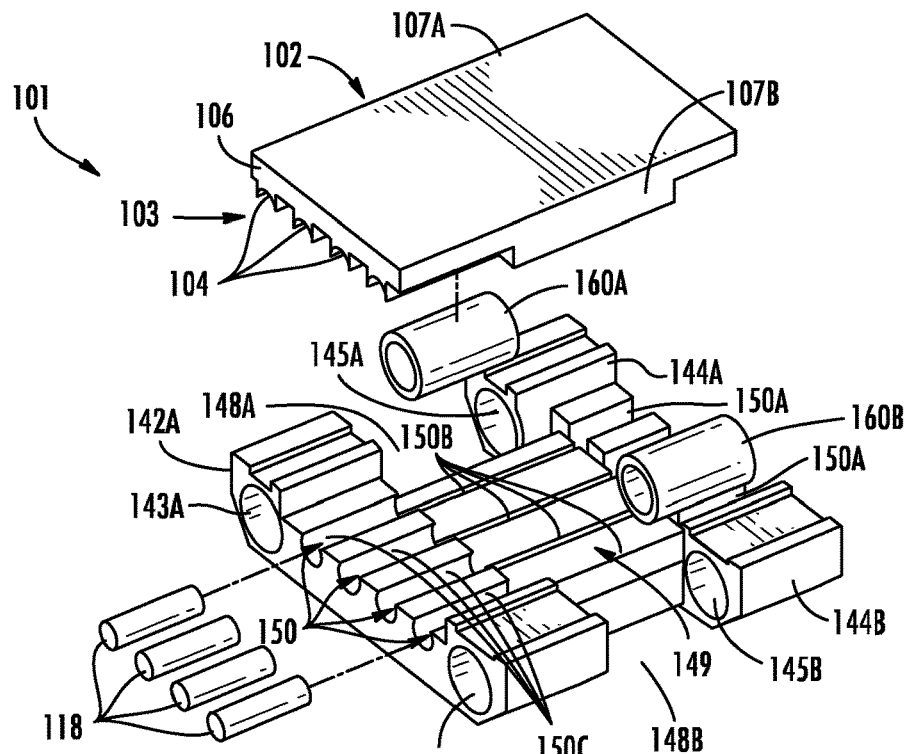
FIG. 5 is an exploded close-up view of another lens holder assembly having an optional cleaning member disposed between slide portions.

Referring now to FIG. 5, an alternative lens holder assembly 101 having a first cylindrical cleaning member 160A positioned between the first forward slide portion 142A and the first rear slide portion 144A, and a second cylindrical cleaning member 160B positioned between the second forward slide portion 142B and the second rear slide portion 144B is illustrated. The first and second cylindrical cleaning members 160A, 160B may be configured to assist in cleaning debris from the first and second alignment pins 132A, 132B, respectively, as the lens holder assembly 101 translates. In one embodiment, the first and second cylindrical cleaning members 160A, 160B are provided in addition to sleeves 146A-146D within the bores 143A, 143B, 145A, 145B as depicted in FIGS. 2B and 2C. In another embodiment, the lens holder assembly comprises first and second cylindrical cleaning members 160A, 160B and not sleeves within the bores 143A, 143B, 145A, 145B. The first and second cylindrical cleaning members 160A, 160B may be made of any material capable of absorbing/attacking and removing debris (e.g., liquid, dust, and the like) from the surface of the first and second alignment pins 132A, 132B. In one embodiment, the first and second cylindrical cleaning members 160A, 160B are made of a micro-fiber.

Figure 6:
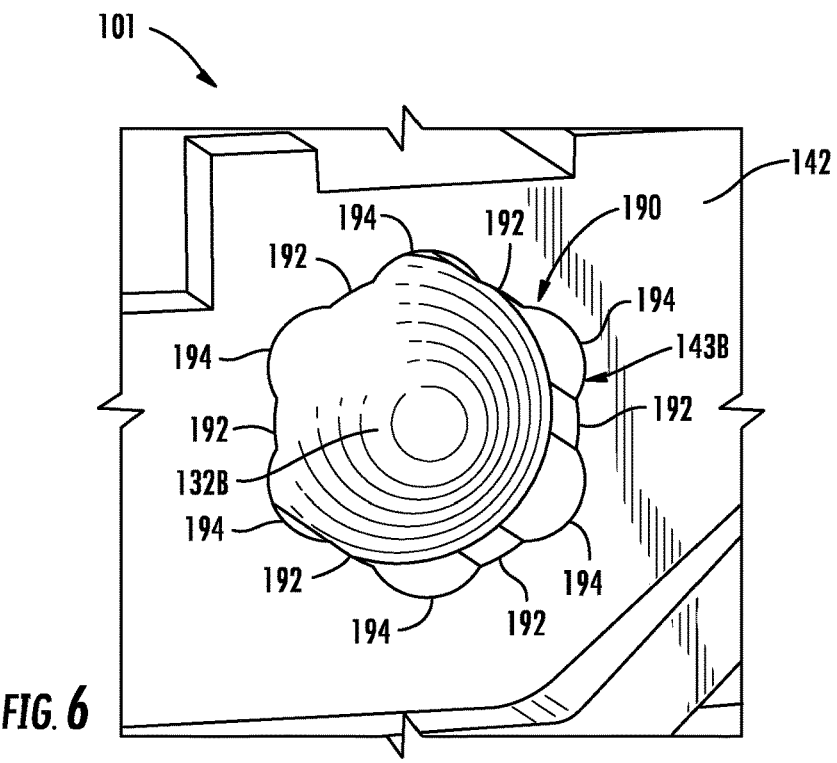
FIG. 6 is a partial close-up view of a bore of a lens holder assembly having an optional profiled circumference.

In addition to, or in lieu of, the bore relief zones 148A, 148B, the first and second alignment pins 132A, 132B and/or the inner surface of the bores 143A, 143B, 145A, 145B may have an optional profiled circumference such that debris within the bores 143A, 143B, 145A, 145B may accumulate in regions that are not in contact with the first and second alignment pins 132A, 132B. Referring now to FIG. 6, a close-up view of a second forward slide portion 142B, second alignment pin 132B, and corresponding bore 143B of a lens holder assembly 101 is schematically depicted. The bore 143B comprises a profiled circumferential surface 190. Although the remaining bores 143A, 145A, 145B of the lens holder assembly 101 are not depicted in FIG. 6, it should be understood that they may also comprise a profiled circumferential surface 190. The exemplary profiled circumferential surface 190 comprises a plurality of contact regions 192 that contacts the outer surface of the second alignment pin 132B, and a plurality of non-contact regions 194 that do not contact the outer surface of the second alignment pin 132B. Accordingly, as the lens holder assembly 101 translates along the first and second alignment pins 132A, 132B as depicted in FIGS. 4A-4B, any debris present within the bore 143B (as well as bores 143A, 145A, 145B) will be pushed into recesses defined by the non-contact regions 194 of the profiled circumferential surface 190 and the outer surface of the second alignment pin 132B (as well as the first alignment pin 132A) and therefore not significantly affect the translation of the lens holder assembly 101 within the connector housing 115. It should be understood that circumferential profiles other than that illustrated in FIG. 6 may be utilized. In alternative embodiments, the first and second alignment pins 132A, 132B may comprise profiled circumferential surfaces to minimize the effect of debris on lens holder assembly 101 translation, or both the bores 143A, 143B, 145A, 145B and the first and second alignment pins 132A, 132B may include profiled surfaces to cause debris to accumulate in benign, non-contact regions.

Referring now to FIGS. 7A and 7B, partial cutaway views of an optical connector 200 having a plurality of optical fiber arrays 220A-220A coupled to a plurality of GRIN lens arrays 231A-231D (only GRIN lens array 231A is visible in FIG. 7A) are schematically illustrated. The optical connector 200 further comprises several mechanical coupling features 210 configured to mate the optical connector 200 with a second optical connector (not shown). As depicted in FIGS. 7A and 7B, a ribbon pitch of the plurality of optical fiber arrays 220A-220D and the size and position of the GRIN lenses 234 have common centerlines, which eliminates the need to transition from a ribbon pitch to a different GRIN lens pitch. Referring specifically to FIG. 7B, a lens holder assembly 230 contains GRIN bores 236 that are sized to accept a GRIN lens 234. The illustrated lens holder assembly 230 and GRIN lenses 234 define a GRIN lens array 231A made up of a plurality of GRIN lens rows 232A-232D. The lens holder assembly 230 further comprises fiber end grooves 237C proximate each GRIN bore 236 to accept optical fiber ends of the optical fiber array 220A, as described below.

The individual optical fibers 222 of the optical fiber array 220A may be disposed within fiber bores 237 of a fiber holder 232. The size and shape of the fiber bores 237 are configured to securely accept and retain the individual optical fibers 222 of the optical fiber array 220A. The fiber bores 237 may comprise a first section 237A having a diameter configured to accept individual optical fibers having one or more outer layers, a second section 237B of a narrowing diameter, and a third section 237C (i.e., fiber end grooves) of a smaller diameter to retain a portion of the optical fibers 222 where the one or more outer layers have been removed to expose optical fiber ends 223. The optical fiber ends 223 are in contact or nearly in contact with an end face 235 of the GRIN lenses 234 such that the optical fibers 222 and the GRIN lenses 234 are optically coupled. The junction between the optical fiber ends 223 and the end face 235 of the GRIN lenses 234 may be provided by index matching or bonding. More specifically, an index matching gel, and/or index matching adhesive (e.g., epoxy or other) that has an index of refraction for index matching can be disposed in the internal chamber 149 to join the faces of the optical fiber ends 223 to the end faces 235 of the corresponding GRIN lenses 234. The recessed cover 102 may then be disposed in the open recess to seal off the internal chamber 149 and secure the GRIN lenses 118 inside the lens holder body 140.

The pitch of the optical fiber array 220A (i.e., an optical fiber pitch) is substantially equal to the pitch of the GRIN lens array 231A (i.e., a lens pitch) such that a transition between a pitch of the optical fiber array 220A and the GRIN lens array 231A is not needed. By way of example, if the GRIN lens array has a lens pitch of 400 microns, then the optical fibers of a ribbon have an optical fiber pitch of about 400 microns for matching the pitch and avoiding relatively large spacing transitions. This aids manufacturing and may also reduce stress and/or strain on the optical fibers.

It should now be understood that embodiments described herein are directed to lens holder assemblies and optical connectors employing groove alignment feature(s) and bore relief zones. The bore relief zones may assist in cleaning the alignment pins and bores of the lens holder assembly to facilitate translation of the lens holder assembly within the plug.

As non-limiting examples, the GRIN lenses disclosed herein may comprise a generally cylindrical glass member having a radially varying index of refraction, the glass member having a length such that the lens has a pitch of less than about 0.23. As used herein, the pitch length of the lens, Lo, is $2\pi/A$; the fractional pitch, or, hereafter, pitch, is $L/Lo=LA/2\pi$, where L is the physical length of the lens. In various embodiments, the pitch is between about 0.08 and 0.23, such as, for example, lenses having pitches of 0.22, 0.21, 0.20, 0.19, 0.18, 0.17, 0.16, 0.15, 0.14, 0.13, 0.12, 0.11, 0.10, 0.09 and 0.08. Some embodiments relate to small diameter lenses, such as lenses having a diameter less than or equal to about one (1) mm, for example, 0.8 mm. In certain embodiments, lenses having a diameter less than about 1 mm are operative to produce a beam having a mode field diameter between about 350 μm and 450 μm when illuminated with a beam having a mode field diameter of about 10.4 μm.

Examples of optical devices that can interface with the GRIN lenses disclosed in the lens holder assemblies disclosed herein include, but are not limited to, fiber optic collimators, DWDMs, OADMs, isolators, circulators, hybrid optical devices, optical attenuators, MEMs devices, and optical switches.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A lens holder assembly comprising:
a lens holder body comprising a one piece molded design with at least one optical component, a mating face, a first forward slide portion and a first rear slide portion disposed on a first side of the lens holder body, and a second forward slide portion and a second rear slide portion disposed on a second side of the lens holder body, wherein:
the first forward slide portion is longitudinally aligned with the first rear slide portion such that the first forward slide portion is separated from the first rear slide portion by a first bore relief zone defined by a first recess such that a first alignment pin disposed within the first forward slide portion and the first rear slide portion is externally exposed by the first bore relief zone;
the second forward slide portion is longitudinally aligned with the second rear slide portion such that the second forward slide portion is separated from the second rear slide portion by a second bore relief zone defined by a second recess such that a second alignment pin disposed within the second forward slide portion and the second rear slide portion is externally exposed by second bore relief zone; and the at least one optical component is located at the mating face and configured to be optically coupled to a mated optical component.

2. The lens holder assembly of claim 1, wherein the at least one optical component comprises at least one refractive lens.

3. The lens holder assembly of claim 1, further comprising at least one groove alignment feature disposed in the lens holder body, wherein:

the at least one optical component comprises at least one gradient-index lens (GRIN) lens; and the at least one groove alignment feature is configured to support the at least one GRIN lens disposed in the lens holder body and substantially align at least one end portion of the at least one GRIN lens with the mating face.

4. The lens holder assembly of claim 3, further comprising:

an internal chamber comprising a recessed floor; and a recessed cover disposed in the internal chamber between the first forward slide portion and the second forward slide portion of the lens holder body, and between the first rear slide portion and the second rear slide portion of the lens holder body.

5. The lens holder assembly of claim 1, wherein a length of the first bore relief zone and a length of the second bore relief zone are greater than or equal to a length of each of the first forward slide portion, the second forward slide portion, the first rear slide portion, and the second rear slide portion.

6. The lens holder assembly of claim 5, further comprising at least one optical fiber disposed within the lens holder body, wherein an end of the at least one optical fiber is optically coupled to the at least one optical component.

7. The lens holder assembly of claim 1, wherein:

each of the first forward slide portion, the second forward slide portion, the first rear slide portion, and the second rear slide portion comprise a bore; and the lens holder assembly further comprises at least one sleeve disposed within at least one of the bores associated with the first forward slide portion, the second forward slide portion, the first rear slide portion, and the second rear slide portion.

8. The lens holder assembly of claim 7, wherein one or more of the bores associated with the first forward slide portion, the second forward slide portion, the first rear slide portion, and the second rear slide portion comprise a profiled circumferential surface.

9. A lens holder assembly comprising:

a lens holder body comprising a one piece molded design with at least one optical component, a mating face, a first forward slide portion and a first rear slide portion disposed on a first side of the lens holder body, and a second forward slide portion and a second rear slide portion disposed on a second side of the lens holder body, wherein:

the first forward slide portion is longitudinally aligned with the first rear slide portion such that the first forward slide portion is separated from the first rear slide portion by a first bore relief zone defined by a first recess such that a first alignment pin disposed within the first forward slide portion and the first rear slide portion is externally exposed by the first bore relief zone;

the second forward slide portion is longitudinally aligned with the second rear slide portion such that the second forward slide portion is separated from the second rear slide portion by a second bore relief zone defined by a second recess such that a second alignment pin disposed within the second forward slide portion and the second rear slide portion is externally exposed by second bore relief zone; and the at least one optical component is located at the mating face and configured to be optically coupled to a mated optical component, wherein the at least one optical component comprises at least one refractive lens.

10. The lens holder assembly of claim 9, wherein a length of the first bore relief zone and a length of the second bore relief zone are greater than or equal to a length of each of the first forward slide portion, the second forward slide portion, the first rear slide portion, and the second rear slide portion.

11. The lens holder assembly of claim 10, further comprising at least one optical fiber disposed within the lens holder body, wherein an end of the at least one optical fiber is optically coupled to the at least one optical component.

12. A lens holder assembly comprising:

a lens holder body comprising a one piece molded design with at least one optical component, a mating face, a first forward slide portion and a first rear slide portion disposed on a first side of the lens holder body, and a second forward slide portion and a second rear slide portion disposed on a second side of the lens holder body, wherein:

the first forward slide portion is longitudinally aligned with the first rear slide portion such that the first forward slide portion is separated from the first rear slide portion by a first bore relief zone defined by a first recess such that a first alignment pin disposed within the first forward slide portion and the first rear slide portion is externally exposed by the first bore relief zone;

the second forward slide portion is longitudinally aligned with the second rear slide portion such that the second forward slide portion is separated from the second rear slide portion by a second bore relief zone defined by a second recess such that a second alignment pin disposed within the second forward slide portion and the second rear slide portion is externally exposed by second bore relief zone; and the at least one optical component is located at the mating face and configured to be optically coupled to a mated optical component, wherein a length of the first bore relief zone and a length of the second bore relief zone are greater than or equal to a length of each of the first forward slide portion, the second forward slide portion, the first rear slide portion, and the second rear slide portion.

13. The lens holder assembly of claim 12, further comprising at least one optical fiber disposed within the lens holder body, wherein an end of the at least one optical fiber is optically coupled to the at least one optical component.

* * * * *